United States Patent
Yamazaki et al.

(10) Patent No.: US 8,098,056 B2
(45) Date of Patent: Jan. 17, 2012

(54) BIDIRECTIONAL CONVERTER AND ELECTRONIC DEVICE

(75) Inventors: Kazuo Yamazaki, Atsugi (JP); Yukihiro Terada, Atsugi (JP); Hidenori Tanaka, Atsugi (JP); Tamiji Nagai, Kawasaki (JP); Toshio Nagai, legal representative, Tokyo (JP)

(73) Assignee: Mitsumi Electric Co., Ltd., Tama-shi (JP)

( * ) Notice: Subject to any disclaimer, the term of this patent is extended or adjusted under 35 U.S.C. 154(b) by 422 days.

(21) Appl. No.: 12/375,651

(22) PCT Filed: Jul. 30, 2007

(86) PCT No.: PCT/JP2007/064864
§ 371 (c)(1),
(2), (4) Date: Jan. 29, 2009

(87) PCT Pub. No.: WO2008/015997
PCT Pub. Date: Feb. 7, 2008

(65) Prior Publication Data
US 2010/0314945 A1 Dec. 16, 2010

(30) Foreign Application Priority Data
Jul. 31, 2006 (JP) .................... 2006-208618

(51) Int. Cl.
G05F 1/00 (2006.01)
G05F 1/613 (2006.01)
G05F 3/16 (2006.01)
(52) U.S. Cl. ........................ 323/222; 323/224
(58) Field of Classification Search .............. 323/222, 323/224
See application file for complete search history.

(56) References Cited

U.S. PATENT DOCUMENTS

| 7,570,033 | B1* | 8/2009 | Ju .................................. 323/224 |
| 2006/0273768 | A1* | 12/2006 | Chen et al. .................... 323/224 |
| 2007/0052395 | A1* | 3/2007 | Belch ............................. 323/222 |
| 2011/0074356 | A1* | 3/2011 | Yamazaki et al. .............. 320/134 |

FOREIGN PATENT DOCUMENTS

| JP | 2001-292567 A | | 10/2001 |
| JP | 2001292567 A | * | 10/2001 |
| JP | 2003-111392 A | | 4/2003 |
| JP | 2004-282824 A | | 10/2004 |
| JP | 2005-57826 A | | 3/2005 |
| JP | 2006-94690 A | | 4/2006 |
| JP | 2006-162920 A | | 6/2006 |

OTHER PUBLICATIONS

English Language International Search Report dated Oct. 16, 2007 issued in parent Appln. No. PCT/JP2007/064864.

* cited by examiner

*Primary Examiner* — Jue Zhang
(74) *Attorney, Agent, or Firm* — Holtz, Holtz, Goodman & Chick, PC (57) ABSTRACT

Provided is a bidirectional converter which has flexibility to be applicable in various conditions and performs stable switching of operation mode at high efficiency. An electronic device which supplies power in various conditions and operates with excellent efficiency is also provided. An electronic device is provided with a bidirectional converter, which has a reactor and four switches between power supply input terminals and a secondary battery, and a system circuit is supplied with an operation voltage through the bidirectional converter. A status signal indicating the operation status of the system circuit is transmitted to a microcomputer of the bidirectional converter, and based on the status signal, switching of operation mode of the bidirectional converter is controlled.

14 Claims, 9 Drawing Sheets

BIDIRECTIONAL CONVERTER AND ELECTRONIC DEVICE

TECHNICAL FIELD

The present invention relates to a bidirectional converter capable of switching input and output of an electric current bidirectionally between a power supply input terminal and a secondary battery or between a load and the secondary battery, and to an electronic device having such a bidirectional converter.

BACKGROUND ART

A wide variety of bidirectional converters have been used to charge a secondary battery by an external power source and to supply power to a load from the secondary battery.

As a related art, a patent document 1 discloses a DC-DC converter that can perform a buck operation and a boost operation bidirectionally.

Patent Document 1: JP-A-2001-292567

DISCLOSURE OF INVENTION

Problem to be Solved by the Invention

For example, if a voltage of an input power source is predetermined when charging a secondary battery and supplying power from the secondary battery using a bidirectional converter, or if a voltage of the secondary battery is set within sort of a narrow range when supplying power from the secondary battery, the bidirectional converter may be designed so as to perform a predetermined buck operation and a predetermined boost operation.

In order to accept power input at various voltage values or to supply power to the fullest from the secondary battery up to a specified minimum charging rate, a bidirectional converter that can flexibly respond to various combinations of input and output voltages is required.

Unfortunately, if the bidirectional converter operates by switching between various control modes under the various conditions without adopting a special structure or method, power conversion efficiency may be lowered, and the bidirectional converter may behave in an erratic way when switching the control modes.

It is, therefore, an object of the present invention to provide a bidirectional converter that can flexibly respond to various conditions, operate at high efficiency, and stably switch between control modes.

It is another object of the present invention to provide an electronic device that can receive power supply under various conditions and operate at high efficiency using the bidirectional converter.

Means for Solving the Problem

To achieve the object described above, according to the present invention, there is provided a bidirectional converter, including: a reactor connected in series between one input-output terminal and another input-output terminal; a first switch connected in series between one end of the reactor and the one input-output terminal; a second switch connected between the one end of the reactor and a reference point of potential; a third switch connected in series between the other end of the reactor and another input-output terminal; a fourth switch connected between the other end of the reactor and a reference point of potential; and a switching control circuit to perform switching control of the first to fourth switches, wherein a buck-boost output from the one input-output terminal to another input-output terminal and a buck-boost output from another input-output terminal to the one input-output terminal can be performed under the switching control by the switching control circuit.

The switching control circuit is capable of switching between control modes. The control modes include: a first buck mode for causing the first switch and the second switch to perform an switching operation to step down a voltage from the one input-output terminal to another input-output terminal; a first boost mode for causing the third switch and the fourth switch to perform an switching operation to boost a voltage from the one input-output terminal to another input-output terminal; a first buck-boost mode for causing the first switch and the fourth switch to be turned on so that an electric current flows through the reactor, and then to be turned off while causing the second switch and the third switch to be turned on so as to output an electric current; a second buck mode for causing the third switch and the fourth switch to perform an switching operation to step down a voltage from another input-output terminal to the one input-output terminal; a second boost mode for causing the first switch and the second switch to perform an switching operation to boost a voltage from another input-output terminal to the one input-output terminal; and a second buck-boost mode for causing the second switch and the third switch to be turned on so that an electric current flows through the reactor, and then to be turned off while causing the first switch and the fourth switch to be turned on so as to output an electric current.

With this structure, it is possible to conduct substantially continuous voltage conversion from buck to boost, thereby flexibly responding to various combinations of input and output voltages. That is, a boost mode and buck mode alone cannot lead to a highly-efficient operation or a stable operation under the condition that an input voltage is nearly equal to an output voltage. The buck-boost mode described above can lead to a highly-efficient operation or a stable operation even under this condition.

Preferably, the bidirectional converter may further include: a loss calculation circuit (24) to calculate a loss between an input and an output; a trial unit (24) to determine a control mode in which the loss is lowered, by executing the control modes on a trial basis; and a storage unit (24) to store the control mode in which the loss is lowered, determined by the trial unit, in association with an input and output voltage or an electric current when executing the control mode, wherein the switching between the control modes is performed based on contents stored in the storage unit.

Preferably, the bidirectional converter may further include: a loss calculation circuit (24) to calculate a loss between an input and an output; and a trial unit (24) to determine a control mode in which the loss is lowered, by executing the control modes on a trial basis, wherein when a voltage or an electric current of an input side or an output side is changed by a predetermined amount, the control mode in which the loss is lowered is determined by the trial unit, and then transition to an operation in the determined control mode is made.

This structure makes it possible to properly switch to an operation with high conversion efficiency under any conditions.

Preferably, when boosting an input voltage to output the boosted voltage, an operation in a buck mode is performed, and then transition to a boost mode is made to output a desired voltage.

Preferably, when boosting an input voltage to output the boosted voltage, operations in a buck mode and a buck-boost mode are performed in this order, and then transition to a boost mode is made to output a desired voltage.

With this structure, boosting a voltage gradually to obtain a desired voltage when outputting a high voltage prevents an inrush current from flowing through a load which has a capacitor element, for example. Accordingly, a stable starting operation can be achieved.

Preferably, the bidirectional converter may further include: a capacitor element (25) to store charges; and a switch circuit (26) to output and block an electric current from the capacitor element to an output side, wherein when switching between the control modes, the switch circuit operates so as to supply the electric current from the capacitor element to the output side.

This structure makes it possible to avoid the disadvantages that an electric current is shut off when switching from one control mode to another. Therefore, a stable operation can be achieved in the load even when switching between the control modes.

To achieve the object described above, according to the present invention, there is provided an electronic device, including: the bidirectional converter of any one of claims 1 to 7, which is provided between a power supply input terminal and a secondary battery; and a system circuit to which an operation voltage is supplied through the bidirectional converter, wherein a status signal representing an operation status of the system circuit is transmitted to the bidirectional converter, and the switching between the control modes of the bidirectional converter is performed based on the status signal.

Power is supplied to the system circuit from each of both ends of the reactor through a switch or a diode.

With this structure, it is possible to supply necessary power to the system circuit from the power supply input terminal or the secondary battery through the bidirectional converter.

Preferably, when voltages are input into the bidirectional converter from both of the power supply input terminal and the secondary battery, an input from the power supply input terminal side is preferentially used rather than the secondary battery side to supply the power to the system circuit.

With this structure, the power of the secondary battery is used only when needed, i.e. when no external power is supplied. Accordingly, the system can persist over a long time.

Although each technical feature has been followed by a reference numeral, which will be shown in embodiments, placed between parentheses in the foregoing description, the present invention is not limited to the foregoing description.

EFFECT OF THE INVENTION

According to a bidirectional converter of the present invention, it is possible to flexibly perform a voltage conversion in response to various conditions, always operate with high conversion efficiency, and stably switch between control modes.

According to an electronic device of the present invention, it is possible to get a system to work, driven by various power supply, charge a secondary battery, or operate, driven by the secondary battery. It is also possible to perform a voltage conversion with high efficiency and stably switch between control modes regardless of change in state.

DESCRIPTION OF REFERENCE NUMERALS 10, 10A and 10B electronic device
20 bidirectional converter
21 SW control circuit
22 and 23 V-I detecting circuit
24 microcomputer
25 mini capacitive unit
26 switch circuit
100 system circuit
211 to 213 voltage detecting circuit
E1 external power source
E2 secondary battery
L1 reactor
S1 to S4 switch
S5 and S6 switch

BEST MODE FOR CARRYING OUT THE INVENTION

Embodiments of the present invention will be described below with reference to the drawings.

First Embodiment

Figure 1:
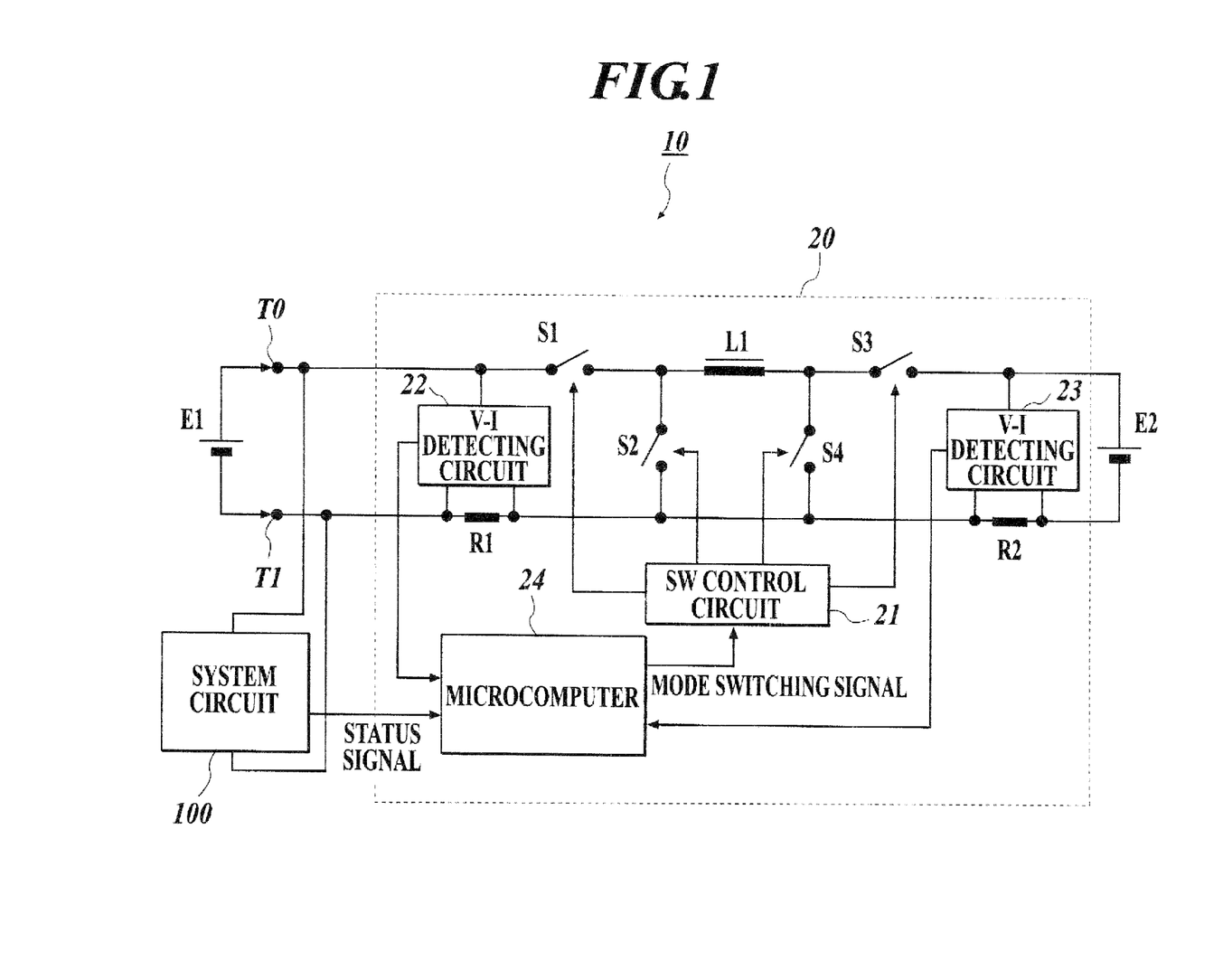
FIG. 1 is a block diagram showing a configuration of an electronic device including a bidirectional converter according to a first embodiment of the present invention.

FIG. 1 is a block diagram showing a configuration of an electronic device including a bidirectional converter according to a first embodiment of the present invention.

The electronic device 10 of this embodiment, such as a portable phone, is provided with a secondary battery E2. The electronic device 10 is configured to operate, driven by an external power source E1, and to charge the secondary battery E2. The electronic device 10 is also configured to operate by electric discharge from the secondary battery E2 when no power is provided from the external power source E1. An AC adapter is electrically connected to or disconnected from power supply input terminals T0 and T1 so that power from the AC adapter can be supplied to the external power source E1.

The electronic device 10 includes a system circuit 100, the secondary battery E2, and a bidirectional converter 20. The system circuit 100 functions and operates as the electronic device 10. An electric current from the external power source E1 is input into the bidirectional converter 20, and the bidirectional converter 20 converts the voltage properly to output the converted voltage to the secondary battery E2. The bidirectional converter 20 converts a voltage of the secondary battery E2 to output the converted voltage to the system circuit 100 as a load.

The system circuit 100 has a plurality of operation modes such as a standby mode which requires less power, a talk mode which requires normal power, and a television output mode which requires much power. The system circuit 100 sends a status signal representing these operation modes to a microcomputer 24 of the bidirectional converter 20.

The bidirectional converter 20 includes a reactor L1, a first switch S1, a second switch S2, a third switch S3, and a fourth switch S4. An electric current flows through the reactor L1 to store energy in the reactor L1. The first switch S1 is connected in series between one end of the reactor L1 and an input-output terminal. The second switch S2 is connected between one end of the reactor L1 and a reference point of potential (e.g. frame ground). The third switch S3 is connected in series between the other end of the reactor L1 and an input-output terminal. The fourth switch S4 is connected between the other end of the reactor L1 and the reference point of potential (e.g. frame ground). Input-output operations are performed by switch control of the first to fourth switches S1 to S4. Each of the first to fourth switches S1 to S4 may include a MOSFET.

The bidirectional converter 20 is provided with a SW control circuit 21, V-I detecting circuits 22 and 23, and the microcomputer 24. The SW control circuit 21 controls switching operations of the first to fourth switches S1 to S4 in a predetermined pattern. The V-I detecting circuits 22 and 23 detect voltages across R1 and R2, respectively, and detect electric currents through R1 and R2, respectively. The microcomputer 24 as a main control unit switches between modes for switch control by sending a mode switching signal to the SW control circuit 21, and selects an optimum switching control mode by inputting detecting signals from the V-I detecting circuits 22 and 23.

In addition to the above-described configuration, the bidirectional converter 20 is provided with a detecting circuit (not shown) for detecting input-output voltages as well as input-output electric currents to provide detecting signals which are input into the SW control circuit 21. The SW control circuit 21 performs switch control, such as pulse-width modulation (PWM) control and pulse-frequency modulation (PFM) control, based on the detecting signals so that the output voltage and the output current can be adjusted. A smoothing circuit may be provided at an input side of the secondary battery E2 or at an input side of the system circuit 100 so as to remove ripples generated by the switch control.

FIGS. 2A to 2D show explanatory diagrams of a plurality of control modes in the bidirectional converter 20 of FIG. 1.

Figure 2A:
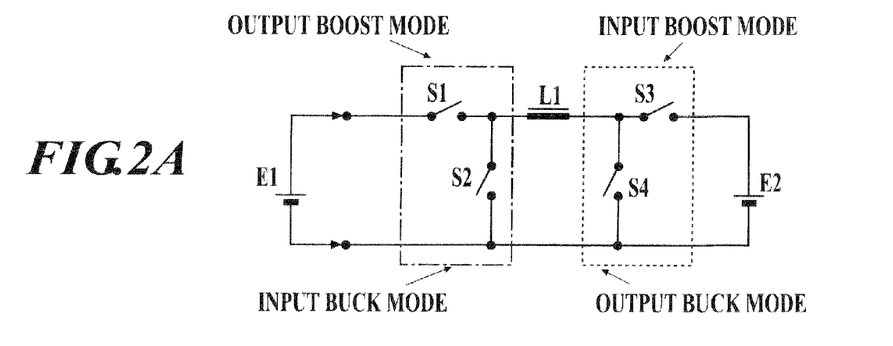
FIG. 2A is an explanatory diagram of a first example of a plurality of control modes in the bidirectional converter of FIG. 1.

The bidirectional converter 20 can operate in each of the control modes for implementing boost, buck and buck-boost bidirectionally. For example, suppose that a direction from the external power source E1 to the secondary battery E2 is an input direction, and a direction from the secondary battery E2 to the external power source E1 is an output direction. As shown in FIG. 2A, assuming that the first switch S1 and the second switch S2 are alternately turned on and off, and the third switch S3 is always on and the fourth switch S4 is always off, an output boost mode can be achieved. That is, in the output boost mode, the voltage of the secondary battery E2 is boosted and supplied to the output side.

Figure 2B:
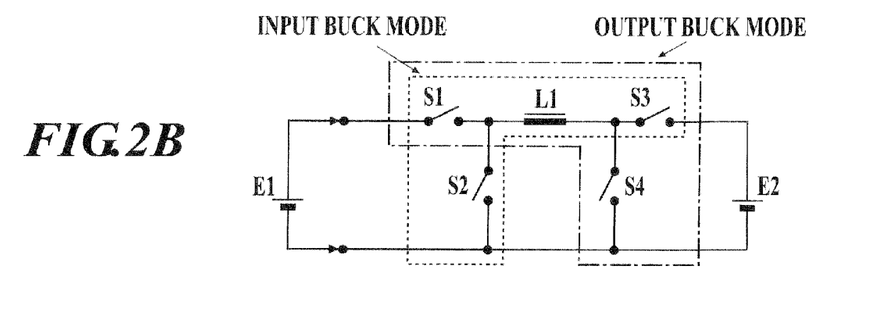
FIG. 2B is an explanatory diagram of a second example of the plurality of control modes in the bidirectional converter of FIG. 1.
Figure 2C:
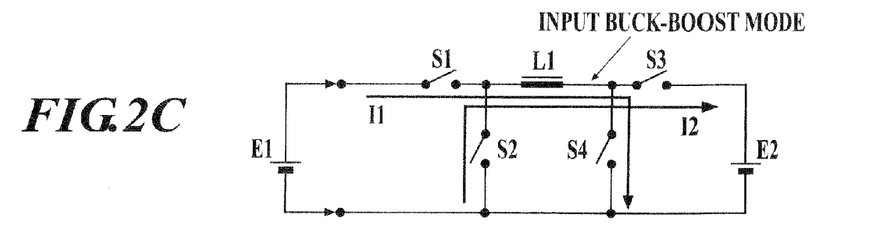
FIG. 2C is an explanatory diagram of a third example of the plurality of control modes in the bidirectional converter of FIG. 1.

Assuming that the first switch S1 is always on and the second switch S2 is always off, and the third switch S3 and the fourth switch S4 are alternately turned on and off, an output buck mode can be achieved. That is, in the output buck mode, the voltage of the secondary battery E2 is stepped down and supplied to the output side. Moreover, as shown in FIG. 2B, in an output buck mode, the third switch S3 is turned off over a period of time when the current through the reactor L1 becomes zero. Thus, electric power saving can be achieved.

Figure 2D:
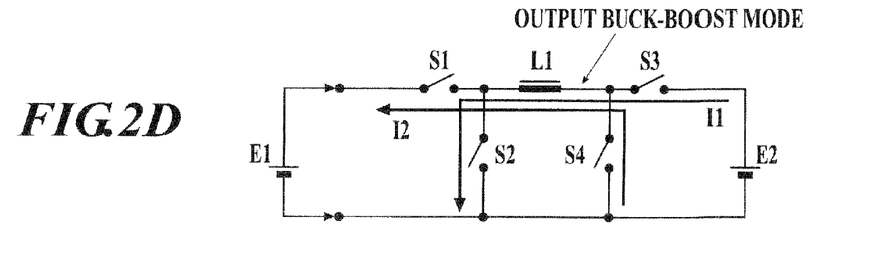
FIG. 2D is an explanatory diagram of a fourth example of the plurality of control modes in the bidirectional converter of FIG. 1.

As shown in FIG. 2D, assuming that the first to fourth switches S1 to S4 are alternately turned on and off so that electric currents I1 and I2 can flow alternately, an operation of an output buck-boost mode when an input voltage is nearly equal to an output voltage, can be achieved. In the output buck-boost mode, the second switch S2 and the third switch S3 are turned on simultaneously so that the current I1 can flow through the reactor L1, driven by the secondary battery E2. After that, the second switch S2 and the third switch S3 are turned off while the first switch S1 and the fourth switch S4 are turned on simultaneously so that the current I2 can flow into the output side by electromotive force of the reactor L1.

As shown in FIGS. 2A to 2D, if the operations described above are performed under the condition that the input side and the output side are replaced with each other, it is possible to operate in an input boost mode, an input buck mode, and an input buck-boost mode.

Figure 3:
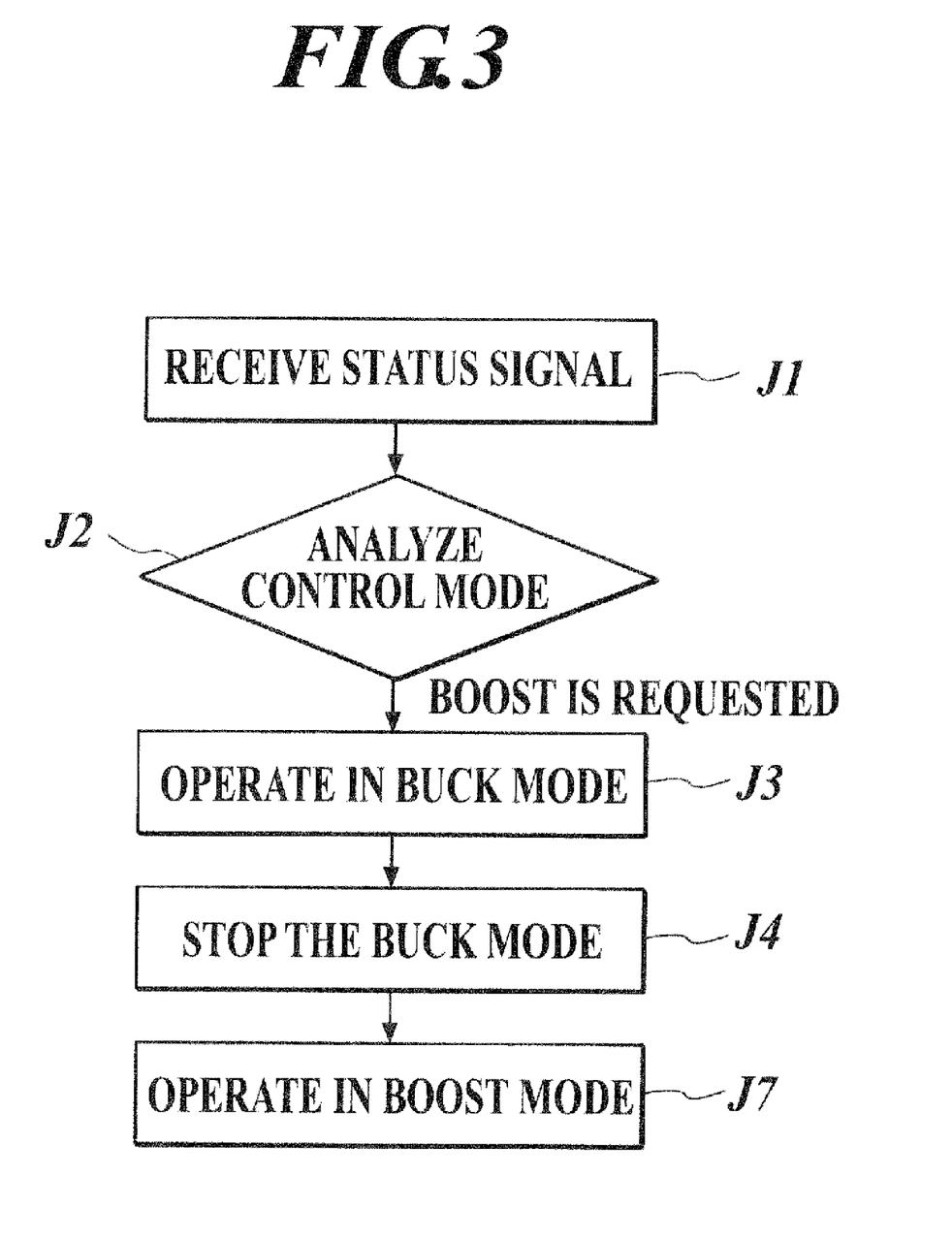
FIG. 3 shows a first exemplary flowchart for explaining an operation when switching to a boost operation.
Figure 4:
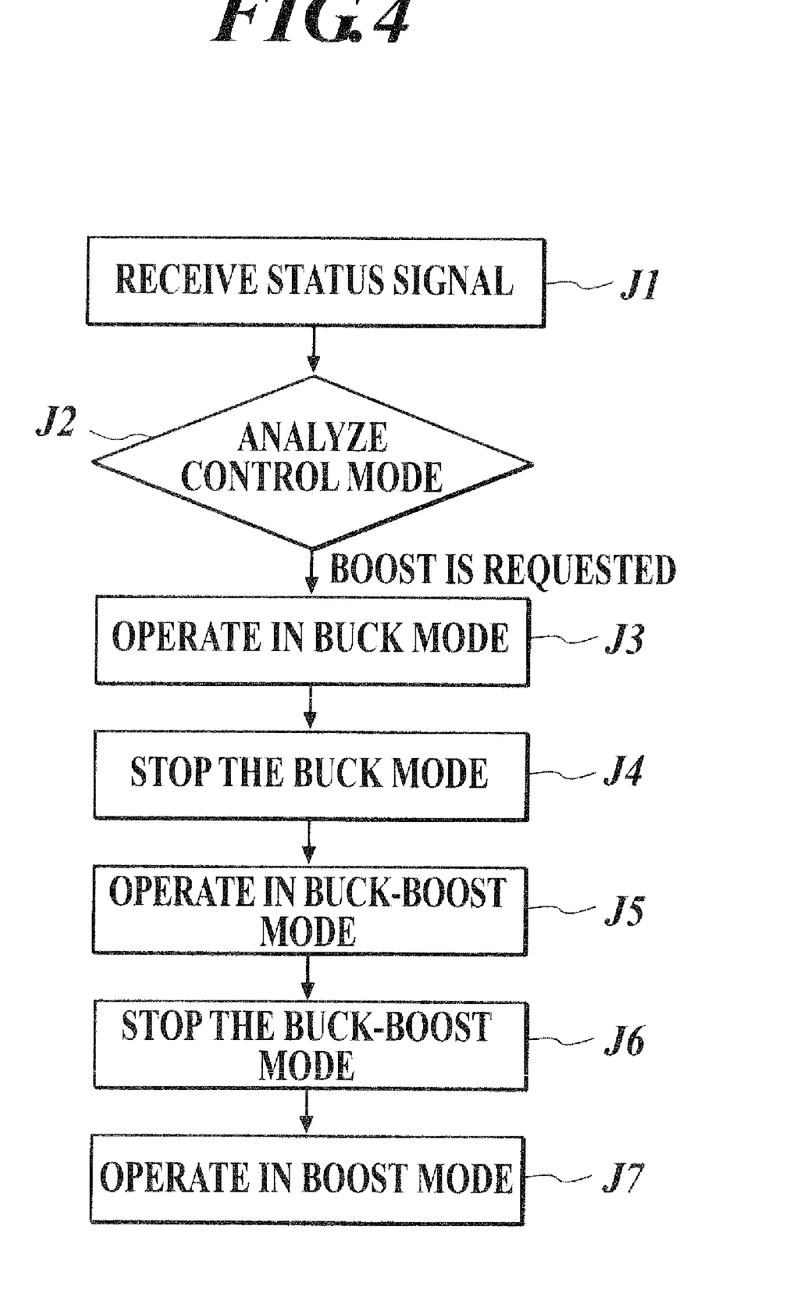
FIG. 4 shows a second exemplary flowchart for explaining an operation when switching to a boost operation.

FIG. 3 shows a first exemplary flowchart for explaining an operation when switching to a boost operation. FIG. 4 shows a second exemplary flowchart for explaining an operation when switching to a boost operation.

In the bidirectional converter 20 with the above-described structure, the microcomputer 24 recognizes an input or disconnection from the external power source E1, a change in the voltage of the external power source E1, and a charging rate or full charge of the secondary battery E2, based on the detecting signals of the V-I detecting circuits 22 and 23. The microcomputer 24 outputs the mode switching signal indicating a switching control mode suitable for the recognition to the SW control circuit 21 so as to switch between the switching control modes.

When the operation mode of the system circuit 100 is changed, the microcomputer 24 receives the status signal from the system circuit 100, and switches between the switching control modes in response to the status signal. Switching processing to a specific control mode is performed especially in the boosting.

As shown in flowcharts of FIGS. 3 and 4, when the status signal is received from the system circuit 100 due to the change in the operation mode of the system circuit 100 (step J1), the microcomputer 24 analyzes the switching control mode suitable for the change (step J2). Suppose it is determined that boosting the voltage of the secondary battery E2 is required to output the voltage to the system circuit 100, for example. In this case, the microcomputer 24 switches between the control modes by gradually boosting the output voltage to output a desired voltage rather than immediately switching to a boost mode, via buck mode operations (steps J3 and J4) and buck-boost mode operations (steps J5 and J6) at short time intervals.

Thus, boosting the voltage gradually makes it possible to avoid the disadvantages that a large inrush current flows through a capacitor element in the system circuit 100 due to sudden application of a high voltage to the system circuit 100, for example, which results in an excessive burden to the circuit.

Figure 5:
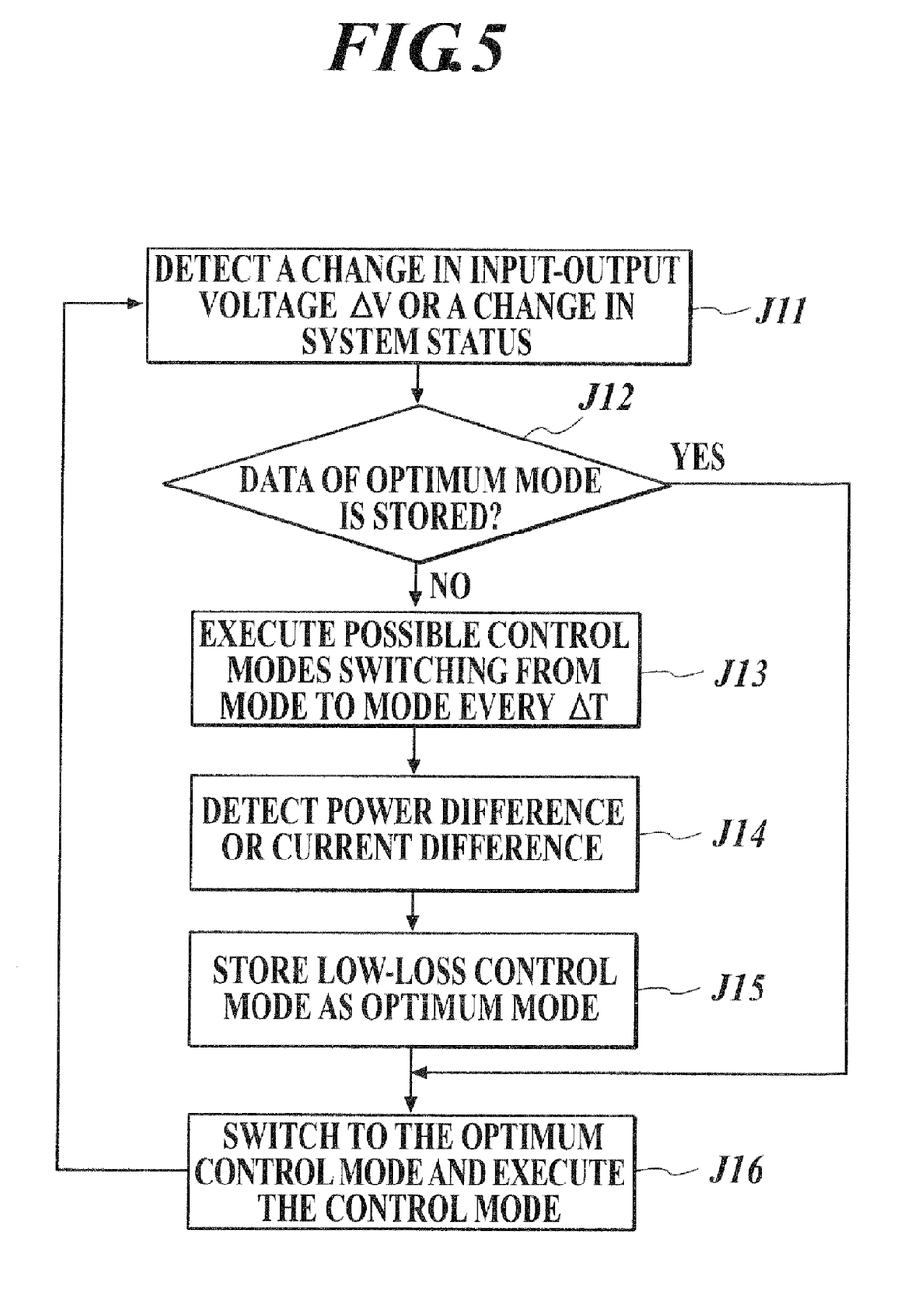
FIG. 5 shows a flowchart for explaining an overall flow of the bidirectional converter of FIG. 1.

FIG. 5 shows a flowchart for explaining an overall flow of the bidirectional converter 20.

The microcomputer 24 performs a control processing so as to select an optimum switching control mode corresponding to a minimum loss in the bidirectional converter 20 when switching from one switching control mode to another is needed and to switch to the optimum switching control mode. The microcomputer 24 also performs a trial processing in which the respective control modes are executed to detect the optimum switching control mode. Moreover, the microcomputer 24 stores each detected optimum switching control mode for each condition in an internal memory in association with data of each condition.

That is, as shown in FIG. 5, when a change in an input-output voltage is detected or a status signal is input from the system circuit 100 (step J11), the microcomputer 24 checks whether an optimum switching control mode which was detected under the same condition as the present condition is stored in the internal memory (step J12). If the optimum switching control mode is stored in the internal memory, the microcomputer 24 outputs a switching signal for switching to the optimum switching control mode to the SW control circuit 21, and proceeds to an operation in this switching control mode (step J16).

On the other hand, if the optimum switching control mode is not stored in the internal memory, the microcomputer 24 causes possible switching control modes to be executed switching from mode to mode every ΔT (e.g. every 5 seconds) as the trial processing, based on a present voltage of the external power source E1 or a voltage of the secondary battery E2 and condition of the system circuit 100 (step J13). The detecting signals for each ΔT are input into the microcomputer 24 from the V-I detecting circuits 22 and 23 to detect a loss in the bidirectional converter 20 by calculating a power difference or a current difference (step J14). Thus, the optimum switching control mode corresponding to a minimum loss can be detected.

This optimum switching control mode is stored in the internal memory in association with data representing the present condition (step J15). A switching signal for switching to this switching control mode is output to the SW control circuit 21, thereby proceeding to an operation in this switching control mode (step J16).

With this control processing, if the voltage conversion can be conducted in either boost mode or buck-boost mode, a switching control mode with lower loss is selected in accordance with each condition such as a power supply voltage or a system operation mode. Therefore, the voltage conversion can always be achieved with high efficiency.

According to the bidirectional converter 20 and the electronic device 10 of this embodiment, it is possible to realize an input and output in the forward direction and the reverse direction, and to conduct substantially continuous voltage conversion from buck to boost, thereby flexibly responding to various combinations of input and output voltages.

Boosting the voltage gradually to obtain a desired voltage when a high voltage is applied to the system circuit 100 prevents an inrush current from flowing through the system circuit 100. Accordingly, a stable starting operation can be achieved.

If the voltage can be supplied in any one of a plurality of control modes, a control mode with lower loss is automatically selected. Therefore, an operation with high efficiency can always be achieved.

Second Embodiment

Figure 6:
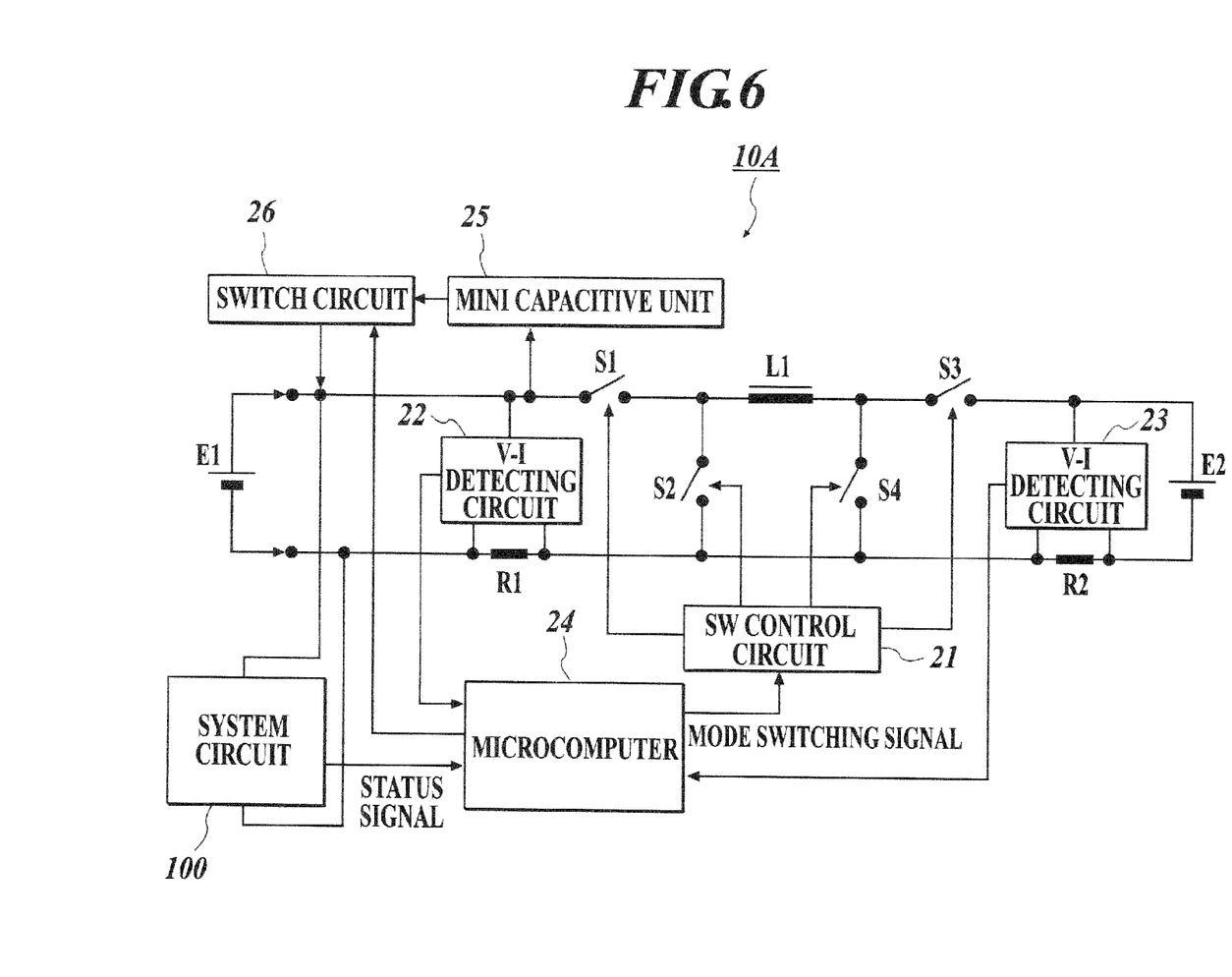
FIG. 6 is a block diagram showing a configuration of an electronic device including a bidirectional converter according to a second embodiment of the present invention.

FIG. 6 is a block diagram showing a configuration of an electronic device including a bidirectional converter according to a second embodiment of the present invention.

An electronic device 10A of the second embodiment is provided with means for supplying an electric current instantaneously when switching from one switching control mode to another so as not to halt electric current supply to the system circuit 100 when switching from one mode to another, in addition to the configuration of the first embodiment.

That is, a mini capacitive unit 25 such as a capacitor, and a switch circuit 26 are connected to a power supply line of the system circuit 100 in the bidirectional converter of this embodiment. The mini capacitive unit 25 stores charges by an output voltage. The switch circuit 26 is turned on and off based on a signal from the microcomputer 24 so that a discharge current from the mini capacitive unit 25 can flow into the system circuit 100.

The microcomputer 24 causes the switch circuit 26 to be turned on so that the current from the mini capacitive unit 25 can flow into the system circuit 100 when switching from one switching control mode to another by outputting a mode switching signal. This control makes it possible to avoid the disadvantages that the electric current supply to the system circuit 100 is shut off when switching from one switching control mode to another.

Third Embodiment

Figure 7:
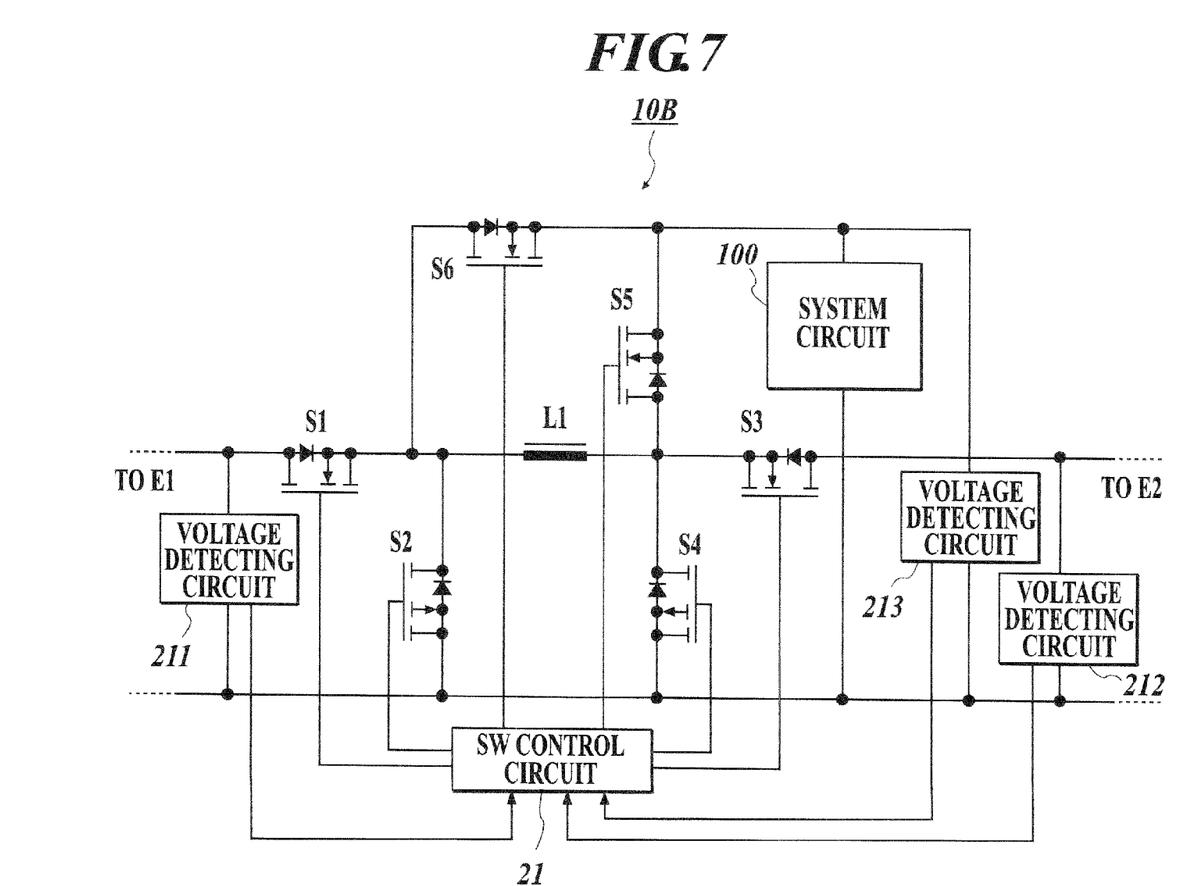
FIG. 7 is a block diagram showing a configuration of an electronic device according to a third embodiment of the present invention.

FIG. 7 is a block diagram showing a configuration of an electronic device according to a third embodiment of the present invention.

In an electronic device 10B of the third embodiment, a connection location of the system circuit (load) 100 to which the power is supplied is different from that of the system circuit 100 of the first embodiment. If both of the voltages of the external power source E1 and the secondary battery E2 are input, one of the voltages can selectively be supplied to the system circuit 100.

As shown in FIG. 7, the bidirectional converter of this embodiment is provided with a power supply line through a fifth switch S5 and a sixth switch S6 from both ends of the reactor L1. The power supply line is connected to the system circuit 100. The bidirectional converter is also provided with a voltage detecting unit 213 for detecting an output voltage to the system circuit 100. An output of the voltage detecting unit is fed back to the SW control circuit 21. The rest of the configuration is similar to the configuration of the first embodiment.

Figure 8A:
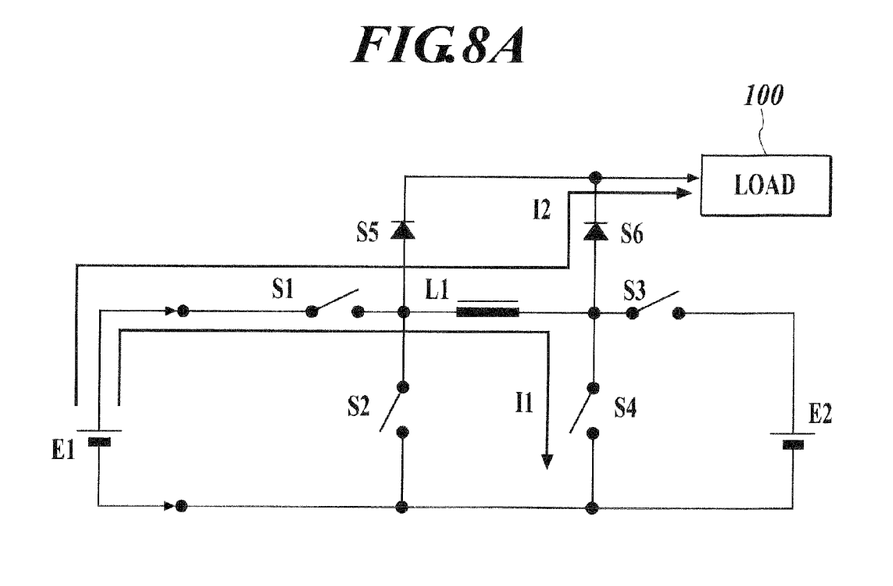
FIG. 8A is an explanatory diagram of a first example of an operation of a bidirectional converter of FIG. 7.
Figure 8B:
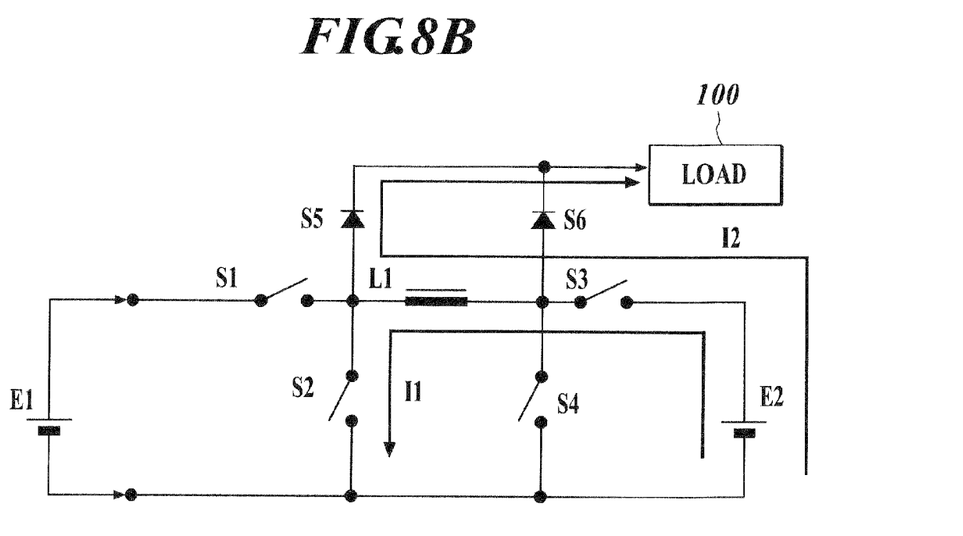
FIG. 8B is an explanatory diagram of a second example of an operation of the bidirectional converter of FIG. 7.

FIGS. 8A and 8B show explanatory diagrams of exemplary operations of the bidirectional converter of FIG. 7.

According to the bidirectional converter with this structure, a bidirectional converter operation in which the external power source E1 is used as an input and the system circuit (load) 100 side is used as an output, can be obtained by turning off the third switch S3 connected to the secondary battery E2 and performing a switching operation of the sixth switch S6 connected to the system circuit 100, for example.

For example, as shown in FIG. 8A, a boost mode can be achieved by performing the switching operation of the fourth switch S4 and the sixth switch S6, always turning on the first switch S1 and always turning off the switches S2 and S3 so that electric currents I1 and I2 can flow alternately. In the boost mode, the voltage of the external power source E1 can be boosted and output to the system circuit 100. A buck mode and a buck-boost mode shown in FIGS. 2A to 2D can also be achieved if the system circuit 100 is used as an output.

A bidirectional converter operation in which the secondary battery E2 side is used as an input and the system circuit (load) 100 side is used as an output, can be obtained by turning off the first switch S1 connected to the external power source E1 and performing a switching operation of the fifth switch S5 connected to the system circuit 100, for example.

For example, as shown in FIG. 8B, a boost mode can be achieved by performing the switching operation of the second switch S2 and the fifth switch S5 so that electric currents I1 and I2 can flow alternately. In the boost mode, the voltage of the secondary battery E2 can be boosted and output to the system circuit 100. A buck mode and a buck-boost mode shown in FIGS. 2A to 2D can also be achieved if the secondary battery E2 is used as an input and the system circuit 100 is used as an output.

In the switching control in the respective switching control modes, control such as a pulse modulation is performed by the SW control circuit 21 based on a signal from the voltage detecting unit 213. Such a control makes it possible to supply a desired voltage to the system circuit 100.

Each of the fifth switch S5 and the sixth switch S6 may include a MOSFET, for example. Alternatively, each of the fifth switch S5 and the sixth switch S6 may include a diode because the system circuit 100 side is not used as an input.

Figure 9:
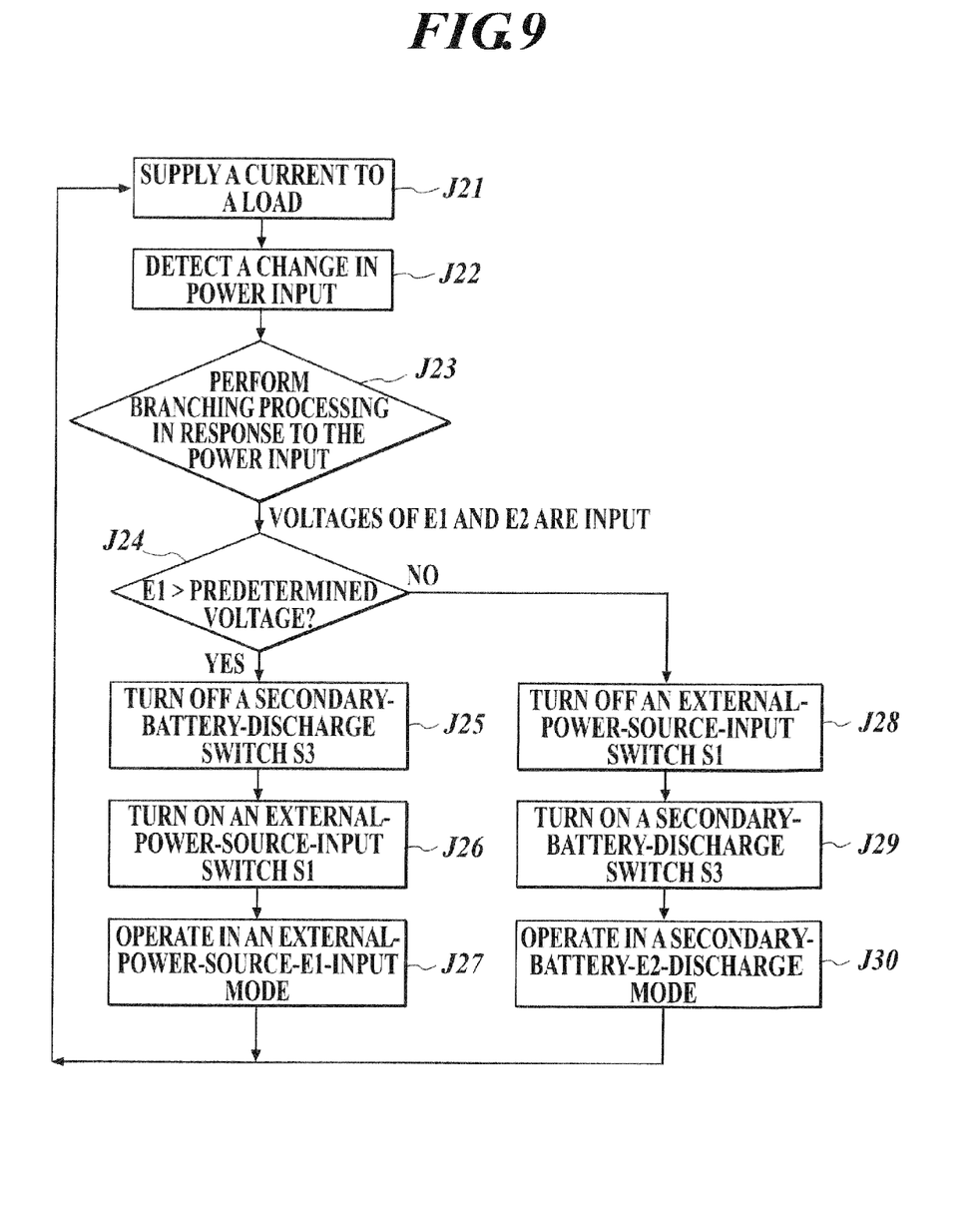
FIG. 9 shows a flowchart for explaining an overall flow of the bidirectional converter of FIG. 7.

FIG. 9 shows a flowchart for explaining an overall flow of the bidirectional converter of the third embodiment.

As with the first embodiment, in the bidirectional converter of this embodiment, the microcomputer 24 recognizes the voltage of the external power source E1, whether the voltage of the external power source E1 is input or not, the voltage of the secondary battery E2, and a status signal representing operation modes of the system circuit 100, and properly selects a switching control mode of the bidirectional converter.

Moreover, as a control processing of this embodiment which is different from that of the first embodiment, the following selection processing of switching control modes is performed. That is, when the voltage of the external power source E1 is input under the condition that the secondary battery E2 is at a predetermined voltage, and thus power can be supplied to the system circuit 100 from both of the external power source E1 and the secondary battery E2, the external power source E1 is preferentially used to supply the power to the system circuit 100.

Specifically, as shown in the flowchart of FIG. 9, under the condition that an electric current is supplied to the system circuit (load) 100 (step J21), if the microcomputer 24 detects a change in a power input (step J22), a branching processing is performed in the microcomputer 24 in response to the power input (step J23).

If it is determined that the voltages of the external power source E1 and the secondary battery E2 are input, it is determined whether the voltage of the external power source E1 is higher than or equal to a predetermined voltage (step J24). If the voltage of the external power source E1 is higher than or equal to a predetermined voltage, the third switch S3 for a discharge from the secondary battery E2 side is turned off (step J25), the first switch S1 for inputting the voltage of the external power source E1 is turned on (step J26), and the mode switching signal is output to the SW control circuit 21 so as to operate in a switching control mode using the external power source E1 as an input (step J27).

On the other hand, if the voltage of the external power source E1 is lower than or equal to a predetermined voltage in the determination processing of step J24, the first switch S1 for inputting the voltage of the external power source E1 is turned off (step J28), the third switch S3 for a discharge from the secondary battery E2 is turned on (step J29), and the mode switching signal is output to the SW control circuit 21 so as to operate in a switching control mode using the secondary battery E2 as an input (step J30).

Next, the current supply in this switching control mode will continue until the power input or a system status changes.

In this control processing, because the external power source E1 is preferentially used rather than the secondary battery E2 to operate the system when the external power source E1 is available, an operation by the secondary battery E2 can persist over a long time after the voltage input of the external power source E1 is cut off.

In the bidirectional converter of this embodiment, when the voltage of the external power source E1 is input, if turning the third switch S3 on and off to input the voltage into the secondary battery E2 side and turning the fifth switch S5 on and off to input the voltage into the system circuit 100 side are executed alternately, the operation of the system circuit 100 can be performed concurrently with secondary battery E2 charging.

Although the best mode for carrying out the invention has been described, the invention is not limited to the first to third embodiments. With respect to detailed and concrete circuit configurations and control methods of the embodiments, various modification and variations can be made without departing from the scope of the invention.

INDUSTRIAL APPLICABILITY

The present invention can be utilized in a bidirectional converter capable of switching input and output of an electric current bidirectionally between a power supply input terminal and a secondary battery or between a load and the secondary battery, and an electronic device having such a bidirectional converter.

The invention claimed is:

1. A bidirectional converter comprising:
   a reactor connected in series between a first input-output terminal and a second input-output terminal;
   a first switch connected in series between a first end of the reactor and the first input-output terminal;
   a second switch connected between the first end of the reactor and a reference point of potential;
   a third switch connected in series between a second end of the reactor and the second input-output terminal;
   a fourth switch connected between the second end of the reactor and a reference point of potential; and
   a switching control circuit which performs switching control of the first to fourth switches,
   wherein a buck-boost output from the first input-output terminal to the second input-output terminal, and a buck-boost output from the second input-output terminal to the first input-output terminal are performable under the switching control by the switching control circuit,
   wherein the switching control circuit switches between control modes, thereby performing the switching control, the control modes including:
      a first buck mode which causes the first switch and the second switch to perform a switching operation to step down a voltage from the first input-output terminal to the second input-output terminal;
      a first boost mode which causes the third switch and the fourth switch to perform a switching operation to boost a voltage from the first input-output terminal to the second input-output terminal;

a first buck-boost mode which causes the first switch and the fourth switch to be turned on so that an electric current flows through the reactor, and then to be turned off while causing the second switch and the third switch to be turned on so as to output an electric current;

a second buck mode which causes the third switch and the fourth switch to perform a switching operation to step down a voltage from the second input-output terminal to the first input-output terminal;

a second boost mode which causes the first switch and the second switch to perform a switching operation to boost a voltage from the second input-output terminal to the first input-output terminal; and a second buck-boost mode which causes the second switch and the third switch to be turned on so that an electric current flows through the reactor, and then to be turned off while causing the first switch and the fourth switch to be turned on so as to output an electric current, and wherein the bidirectional converter further comprises:

a loss calculation circuit which calculates a loss between an input and an output;

a trial unit which determines a control mode in which the loss is lowered, by executing the control modes on a trial basis; and a storage unit which stores the control mode in which the loss is lowered, determined by the trial unit, in association with an input and output voltage or an electric current when executing the control mode, wherein the switching between the control modes is performed based on contents stored in the storage unit.

2. The bidirectional converter according to claim 1, wherein when boosting an input voltage to output the boosted voltage, an operation in a buck mode is performed, and then transition to a boost mode is made to output a desired voltage.

3. The bidirectional converter according to claim 1, wherein when boosting an input voltage to output the boosted voltage, operations in a buck mode and a buck-boost mode are performed in this order, and then transition to a boost mode is made to output a desired voltage.

4. The bidirectional converter according to claim 1, further comprising:

a capacitor element which stores charges; and a switch circuit which outputs and blocks an electric current from the capacitor element to an output side, wherein when switching between the control modes, the switch circuit operates so as to supply the electric current from the capacitor element to the output side.

5. A bidirectional converter comprising:

a reactor connected in series between a first input-output terminal and a second input-output terminal;

a first switch connected in series between a first end of the reactor and the first input-output terminal;

a second switch connected between the first end of the reactor and a reference point of potential;

a third switch connected in series between a second end of the reactor and the second input-output terminal;

a fourth switch connected between the second end of the reactor and a reference point of potential; and a switching control circuit which performs switching control of the first to fourth switches, wherein a buck-boost output from the first input-output terminal to the second input-output terminal, and a buck-boost output from the second input-output terminal to the first input-output terminal are performable under the switching control by the switching control circuit, wherein the switching control circuit switches between control modes, thereby performing the switching control, the control modes including:

a first buck mode which causes the first switch and the second switch to perform a switching operation to step down a voltage from the first input-output terminal to the second input-output terminal;

a first boost mode which causes the third switch and the fourth switch to perform a switching operation to boost a voltage from the first input-output terminal to the second input-output terminal;

a first buck-boost mode which causes the first switch and the fourth switch to be turned on so that an electric current flows through the reactor, and then to be turned off while causing the second switch and the third switch to be turned on so as to output an electric current;

a second buck mode which causes the third switch and the fourth switch to perform a switching operation to step down a voltage from the second input-output terminal to the first input-output terminal;

a second boost mode which causes the first switch and the second switch to perform a switching operation to boost a voltage from the second input-output terminal to the first input-output terminal; and a second buck-boost mode which causes the second switch and the third switch to be turned on so that an electric current flows through the reactor, and then to be turned off while causing the first switch and the fourth switch to be turned on so as to output an electric current, and wherein the bidirectional converter further comprises:

a loss calculation circuit which calculates a loss between an input and an output; and a trial unit which determines a control mode in which the loss is lowered, by executing the control modes on a trial basis, wherein when a voltage or an electric current of an input side or an output side is changed by a predetermined amount, the control mode in which the loss is lowered is determined by the trial unit, and then transition to an operation in the determined control mode is made.

6. The bidirectional converter according to claim 5, wherein when boosting an input voltage to output the boosted voltage, an operation in a buck mode is performed, and then transition to a boost mode is made to output a desired voltage.

7. The bidirectional converter according to claim 5, wherein when boosting an input voltage to output the boosted voltage, operations in a buck mode and a buck-boost mode are performed in this order, and then transition to a boost mode is made to output a desired voltage.

8. The bidirectional converter according to claim 5, further comprising:

a capacitor element which stores charges; and a switch circuit which outputs and blocks an electric current from the capacitor element to the output side, wherein when switching between the control modes, the switch circuit operates so as to supply the electric current from the capacitor element to the output side.

9. An electronic device, comprising:

a bidirectional converter which is provided between a power supply input terminal and a secondary battery; and a system circuit to which an operation voltage is supplied through the bidirectional converter, wherein the bidirectional converter comprises:

a reactor connected in series between a first input-output terminal and a second input-output terminal;
a first switch connected in series between a first end of the reactor and the first input-output terminal;
a second switch connected between the first end of the reactor and a reference point of potential;
a third switch connected in series between a second end of the reactor and the second input-output terminal;
a fourth switch connected between the second end of the reactor and a reference point of potential; and
a switching control circuit which performs switching control of the first to fourth switches,
wherein a buck-boost output from the first input-output terminal to the second input-output terminal, and a buck-boost output from the second input-output terminal to the first input-output terminal are performable under the switching control by the switching control circuit,
wherein the switching control circuit switches between control modes, thereby performing the switching control, the control modes including:
a first buck mode which causes the first switch and the second switch to perform a switching operation to step down a voltage from the first input-output terminal to the second input-output terminal;
a first boost mode which causes the third switch and the fourth switch to perform a switching operation to boost a voltage from the first input-output terminal to the second input-output terminal;
a first buck-boost mode which causes the first switch and the fourth switch to be turned on so that an electric current flows through the reactor, and then to be turned off while causing the second switch and the third switch to be turned on so as to output an electric current;
a second buck mode which causes the third switch and the fourth switch to perform a switching operation to step down a voltage from the second input-output terminal to the first input-output terminal;
a second boost mode which causes the first switch and the second switch to perform a switching operation to boost a voltage from the second input-output terminal to the first input-output terminal; and
a second buck-boost mode which causes the second switch and the third switch to be turned on so that an electric current flows through the reactor, and then to be turned off while causing the first switch and the fourth switch to be turned on so as to output an electric current,
wherein the bidirectional converter further comprises:
a loss calculation circuit which calculates a loss between an input and an output;
a trial unit which determines a control mode in which the loss is lowered, by executing the control modes on a trial basis; and
a storage unit which stores the control mode in which the loss is lowered, determined by the trial unit, in association with an input and output voltage or an electric current when executing the control mode, wherein the switching between the control modes is performed based on contents stored in the storage unit, and
wherein a status signal representing an operation status of the system circuit is transmitted to the bidirectional converter, and the switching between the control modes of the bidirectional converter is performed based on the status signal.

10. The electronic device according to claim 9, wherein power is supplied to the system circuit from both ends of the reactor through switches or diodes.

11. The electronic device according to claim 10, wherein when voltages are input into the bidirectional converter from both of the power supply input terminal and the secondary battery, an input from the power supply input terminal is preferentially used rather than the secondary battery to supply the power to the system circuit.

12. An electronic device, comprising:
a bidirectional converter which is provided between a power supply input terminal and a secondary battery; and
a system circuit to which an operation voltage is supplied through the bidirectional converter,
wherein the bidirectional converter comprises:
a reactor connected in series between a first input-output terminal and a second input-output terminal;
a first switch connected in series between a first end of the reactor and the first input-output terminal;
a second switch connected between the first end of the reactor and a reference point of potential;
a third switch connected in series between a second end of the reactor and the second input-output terminal;
a fourth switch connected between the second end of the reactor and a reference point of potential; and
a switching control circuit which performs switching control of the first to fourth switches,
wherein a buck-boost output from the first input-output terminal to the second input-output terminal, and a buck-boost output from the second input-output terminal to the first input-output terminal are performable under the switching control by the switching control circuit,
wherein the switching control circuit switches between control modes, thereby performing the switching control, the control modes including:
a first buck mode which causes the first switch and the second switch to perform a switching operation to step down a voltage from the first input-output terminal to the second input-output terminal;
a first boost mode which causes the third switch and the fourth switch to perform a switching operation to boost a voltage from the first input-output terminal to the second input-output terminal;
a first buck-boost mode which causes the first switch and the fourth switch to be turned on so that an electric current flows through the reactor, and then to be turned off while causing the second switch and the third switch to be turned on so as to output an electric current;
a second buck mode which causes the third switch and the fourth switch to perform a switching operation to step down a voltage from the second input-output terminal to the first input-output terminal;
a second boost mode which causes the first switch and the second switch to perform a switching operation to boost a voltage from the second input-output terminal to the first input-output terminal; and
a second buck-boost mode which causes the second switch and the third switch to be turned on so that an electric current flows through the reactor, and then to be turned off while causing the first switch and the fourth switch to be turned on so as to output an electric current,
wherein the bidirectional converter further comprises:
a loss calculation circuit which calculates a loss between an input and an output; and a trial unit which determines a control mode in which the loss is lowered, by executing the control modes on a trial basis, wherein when a voltage or an electric current of an input side or an output side is changed by a predetermined amount, the control mode in which the loss is lowered is determined by the trial unit, and then transition to an operation in the determined control mode is made, and wherein a status signal representing an operation status of the system circuit is transmitted to the bidirectional converter, and the switching between the control modes of the bidirectional converter is performed based on the status signal.

13. The electronic device according to claim 12, wherein power is supplied to the system circuit from both ends of the reactor through switches or diodes.

14. The electronic device according to claim 13, wherein when voltages are input into the bidirectional converter from both of the power supply input terminal and the secondary battery, an input from the power supply input terminal is preferentially used rather than the secondary battery to supply the power to the system circuit.

* * * * *